3,085,872
METHOD FOR PRODUCING THE REFRACTORY METALS HAFNIUM, TITANIUM, VANADIUM, SILICON, ZIRCONIUM, THORIUM, COLUMBIUM, AND CHROMIUM

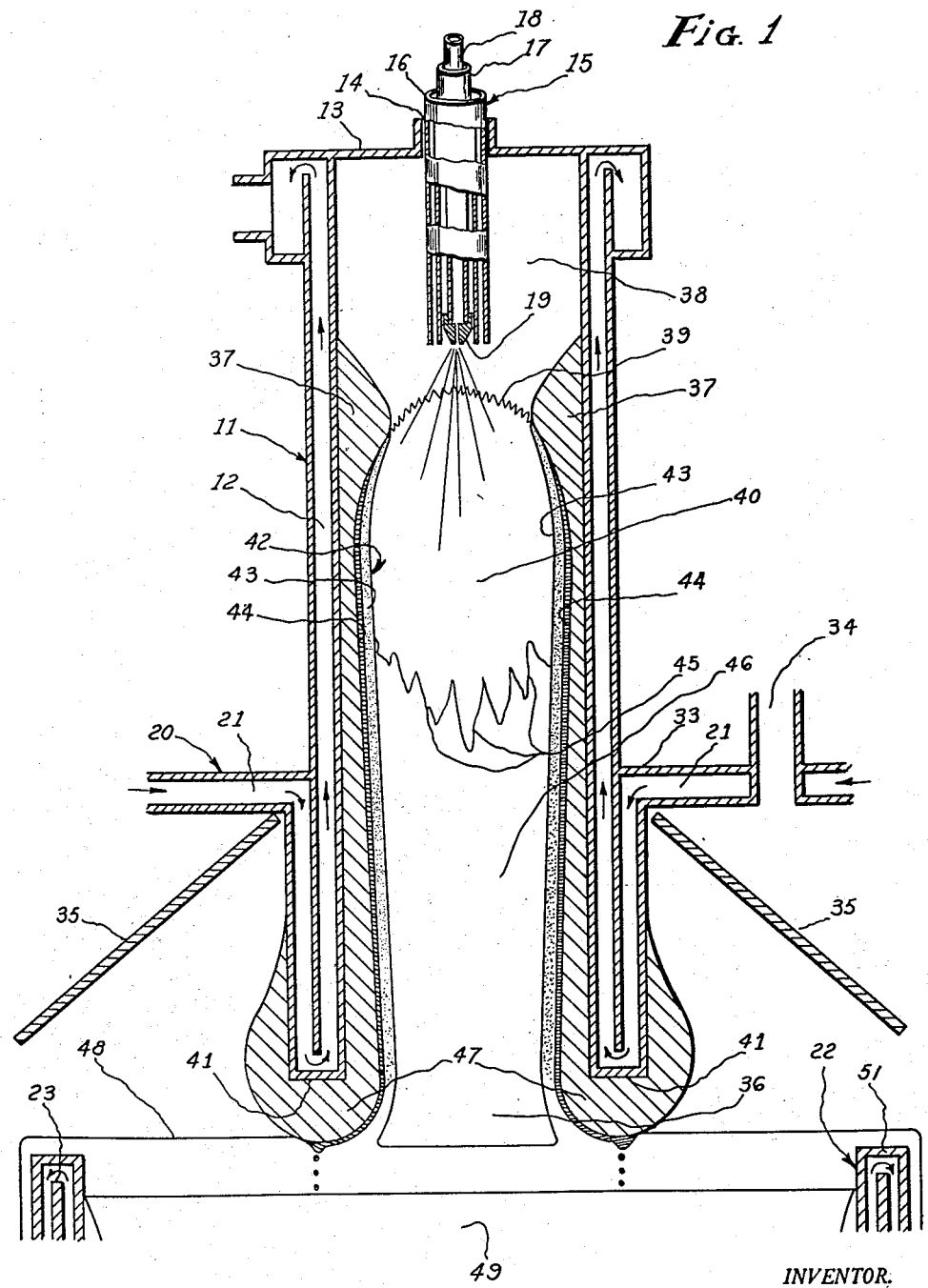

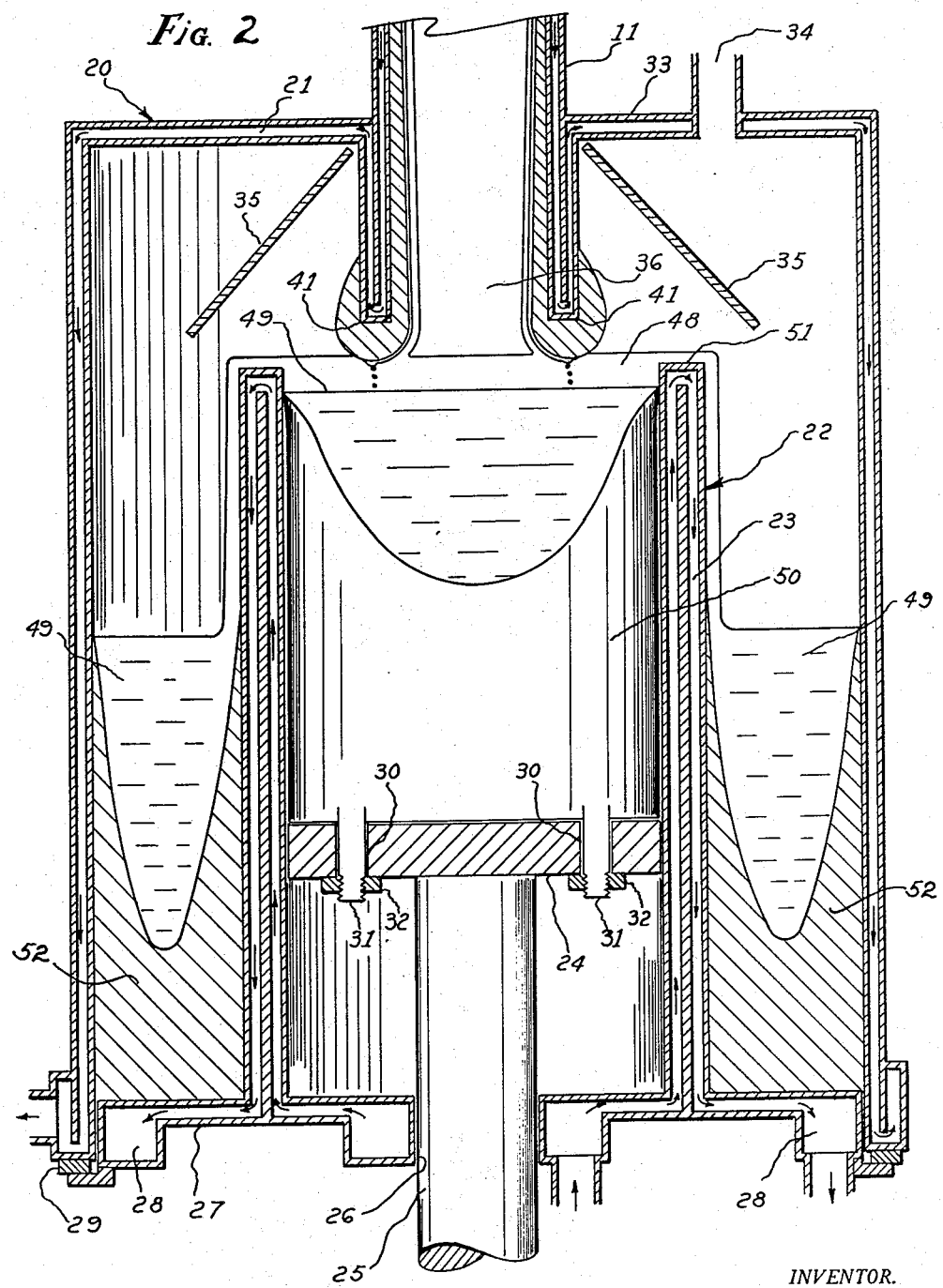

Kenneth Frank Griffiths, 47 Branch Brook Place, Newark, N.J.
Filed July 1, 1958, Ser. No. 745,946
9 Claims. (Cl. 75—84.1)

This invention relates to the production of the refractory metals: titanium, zirconium, vanadium, hafnium, silicon, thorium, chromium and columbium and is a continuation in part of patent application 499,750, filed in the United States Patent Office April 6, 1955, now abandoned, and of patent application 632,549, filed in the United States Patent Office on January 4, 1957, now abandoned, and of patent application 697,321, filed in the United States Patent Office on November 19, 1957, now abandoned.

Specifically, my present invention relates to an improved liquid phase process for producing the refractory metals: titanium, zirconium, vanadium, hafnium, silicon, thorium, chromium and columbium by the reduction of a halide of the desired metal product with a sufficient amount of reducing agent in a zone surrounded by a two-component flowing film of liquid metal product and liquid reducing agent halide supported by a metal product lining.

It is among the objects of my invention to produce relatively pure refractory metals by the reduction of a metal product halide with a suitable reducing agent such that there is a high percentage yield of molten metal product.

Another object of my invention is to produce relatively pure refractory metals by means of a reaction in which the products appear principally in the liquid phase immediately after they form.

Another object of my invention is to separate the molten reaction products while they are in a two-component molten film flowing over a lining of frozen metal product adhering to the walls of the reaction chamber.

Still another object of my invention is to discharge molten metal product from the reaction chamber in relatively large drops rather than a finely divided mist and to freeze the same so as to form discrete, large size shot or a solid ingot.

A further object of my invention is to condense any reducing agent halide gas produced, in the reaction chamber and at a temperature higher than the melting point of the metal product, such that all the reducing agent halide leaves the reaction chamber in liquid phase.

A still further object of my invention is to produce and discharge all the metal product in and from the reaction chamber in the liquid phase by maintaining the temperature in the reaction chamber higher than the melting point of the metal product.

Another object of my invention is to reduce a maximum amount of the metal product halide to the metal product at a temperature higher than the melting point of the metal product.

Still another object of my invention is to discharge the molten metal product from the reaction chamber relatively free of dissolved reducing agent.

An additional object of my invention is to discharge the reaction products from the reaction chamber in such a physical state, i.e. in a non-turbulent state and with the metal product in large drops rather than in a finely divided mist, that the reducing agent halide and the metal product may be gravitationally separated so as to produce a metal product ingot completely free of occluded reducing agent halide.

Another object of my invention is to conduct the reaction under such conditions that the metal product does not become contaminated with unwanted impurities.

Still a further object of my invention is to effect a relatively high production rate of pure metal product in a small reaction chamber fabricated of cheap, commonly used materials.

Yet another object of my invention is to introduce the reactants into the reaction chamber at a relatively low temperature without impairing the efficiency of the reaction.

These objects and advantages as well as other objects and advantages may be achieved by my improved liquid phase process, in which a metal product halide is reacted continuously with a stream of reducing agent in a reaction chamber whose walls are lined with frozen metal product and under the following general conditions:

(1) The temperature, pressure and the net heat balance within the reaction chamber system are such as to create and maintain steady state conditions under which the reaction products appear in the liquid phase and form and maintain a two-component flowing film of liquid reducing agent halide overlying liquid metal product on the surface of a solid metal product lining lightly adhering to the walls of the reaction chamber.

(2) The pressure of the reaction chamber is equal to or slightly greater than the effective vapor pressure of the reducing agent halide at the temperature existing at or in the vicinity of the two-component flowing film of molten reaction products flowing on the frozen metal product lining.

(3) The walls of the reaction chamber under the metal product lining are maintained substantially below the melting point of the metal product.

(4) Liquid metal product forms within the reaction flame and impinges on the two-component liquid flowing film; whereas, some of the reducing agent halide forms in the liquid phase within the reaction flame and some forms in the gas phase and thereafter condenses on the two-component flowing film.

(5) The liquid reaction products which collect on the solid metal product lining adhering to the walls of the reaction chamber, separate into two, distinct, liquid flowing films, one of pure liquid metal product overlying the solid metal product lining and the other of liquid reducing agent halide overlying the liquid metal product film.

(6) The temperature, pressure and the net heat balance for the reaction chamber system are so controlled that the reaction products leave the reaction chamber in the liquid phase and that the metal product lining does not increase to a thickness sufficient to block the exit of the reaction chamber.

My process may be carried out in an apparatus which comprises generally a reaction chamber or burner which is provided with means for introducing fluidized reactants into its upper portion in such a manner as to produce a flame-type reaction within the burner. Underlying the reaction chamber is a collection chamber into which molten reaction products fall. The walls of both the reaction chamber and the collection chamber are provided with jackets or passages through which a suitable coolant may be circulated. The reaction chamber walls are usually fabricated of copper or some other material with a high coefficient of thermal conductivity. The walls of the collection chamber may also be formed of copper, nickel or any other material which need not be particularly heat resistant but which has a high coefficient of thermal conductivity.

Although the shape of the reaction chamber and the collection chamber is not critical to my invention, as a practical matter, I prefer that the reaction chamber be cylindrical with its long axis vertical and with a high length to diameter ratio. The reaction chamber is closed at the top and open at the bottom to discharge reaction products into the collection chamber below. I have found that water is a suitable coolant as is liquid sodium-potassium alloy.

The interior walls of the reaction chamber are lined with solid metal product or metal product sponge of a variable composition. This lining may be built up by the freezing of reaction products, principally metal product, on the walls as the reaction proceeds, or may be placed there before the reaction starts. The control of the steady state thickness of the lining and its initial creation will be more fully described later.

Choice of Reactants

A combination of a reducing agent and a metal product halide must be chosen which will react to form a reducing agent halide whose critical temperature is higher than the melting point of the metal product, otherwise, it would be impossble to produce both the reaction products in the liquid phase. It is preferable to choose a combination which will be productive of a reducing agent halide which has the lowest possible vapor pressure at the melting point of the metal product so that the process can be carried out at the lowest possible pressure. Moreover, it is desirable that the reducing agent halide have a vapor pressure substantially below the vapor pressure of the reducing agent in order that condensation of the reducing agent within the reaction zone may be minimized. In general, the reactants should have the following characteristics:

Reducing Agent (1) Low melting point to facilitate its introduction into the reaction chamber at a controlled flow rate.

(2) High vapor pressure to minimize the amount of reducing agent that will dissolve in the molten metal product formed in the reaction flame zone.

(3) Be productive of halides with a low vapor pressure at the melting point of the metal product to minimize the necessary reaction pressure.

(4) Be productive of halides which are stable at the high temperature employed in the reaction zone in order that the reaction may go to completion with the reducing agent halide being condensed with the metal product.

(5) Have a low equivalent weight to minimize the weight necessary to produce a given weight of metal product.

(6) Have a generally low cost.

With these factors in mind, I find that lithium, sodium, potassium, rubidium, cesium, magnesium and calcium are suitable reducing agents. Among these, sodium is the preferred reducing agent for producing titanium, vanadium, zirconium, silicon, thorium and chromium. Calcium and magnesium are preferred for the production of columbium because their fluorides have much lower vapor pressures than any of the halides of the other named reducing agents at the melting point of columbium.

Metal Product Halide (1) Should be able to exist in either the liquid or gas phase at the lowest possible temperature so as to facilitate its introduction into the reaction chamber at a controlled rate.

(2) Should form a reducing agent halide with the lowest possible vapor pressure at the melting point of the metal product to minimize the necessary reaction pressure. In this respect, generally, the lower the atomic weight of the halogen the better.

With these factors in mind, any metal product halide is suitable which will be productive of a reducing agent halide whose critical temperature is higher than the melting point of the metal product.

Mechanism of the Reaction

The actual mechanism of the reaction is highly complex and requires a thorough examination. At the outset, I must say that many of the observations respecting the kinetics of the reaction are based on theory, theoretical calculations and general conclusions drawn from observations of a test reactor and data obtained therefrom.

If the reaction is carried out in an elongated cylindrical reaction chamber closed at the top and open at the bottom, it is convenient for descriptive purposes to delineate the following three zones.

Zone 1 extends from the top of the reaction chamber to the region adjacent to the end of the imput spray nozzle. In this zone, there is a protective layer of gas, preferably one of the inert gases, which inhibits the deposition of solid reaction products on the reactant spray nozzle orifices which would block them. Thus, it is necessary only that the protective gas layer surround the orifices sufficiently to prevent blockage, but it may extend to the top of the reaction chamber in some instances.

Zone 2 lies immediately below zone 1 and may be called the reaction flame zone. The principal part of the reaction occurs in zone 2 in a turbulent flame-type reaction. The metal product halide in either the gaseous, liquid or fluidized solid form may be introduced through the imput nozzle. If introduced in either the liquid or fluidized solid form, this reactant may flash almost instantly to the gas phase due to the exothermic heat of reaction. The reducing agent is preferably introduced in the liquid phase through one of the orifices in the imput nozzle. As the reactants come in contact with one another, a spontaneous flame-type reaction occurs. The exact mechanism of the flame is complex. The possibility exists that most of the reaction might occur along the exposed surface of the two-component liquid film which would act as a flame-holder. On the other hand, it is possible that the reaction would occur within the flame itself either as small droplets of reducing agent burning in an atmosphere of metal product halide or vice versa depending upon which reactant was the more volatile. Decending through zone 2, the concentration of reducing agent halide gas increases. Of course, throughout zone 2, there would be found highly variable partial pressures of each reactant, reaction product and stable intermediate halide. It should be noted that all substances leaving zone 2 must have a temperature at least as high as the melting point of the metal product. Also, the quantity of inert gas in the reaction flame should be held to a minimum to prevent dilution. Such dilution makes it more difficult to condense reducing agent halide in the reaction chamber. Although the metal product formed in zone 2 frequently includes excessive amounts of dissolved reducing agent, such can be removed by a further reaction in the condensation zone below.

Zone 3, the condensation zone, lies immediately below zone 2. Here, most of the reducing agent halide gas condenses on the exposed surface of the two-component liquid flowing film. As the reducing agent halide condenses, it may bring down some unreacted gaseous reactants and intermediate reaction products. These in turn react to form additional liquid metal product and liquid reducing agent halide. In addition to this reaction which occurs upon condensation, the molten metal product may be purified of reducing agent solute by a true liquid phase reaction. This is an extraction type reaction between reducing agent solute in a metal product solvent and metal product halide solute in a reducing agent halide solvent. The purity of the metal product flowing from zone 3 improves as the ratio of reducing agent solute to metal product halide solute in zone 3 decreases. In addition to the condensation of reducing agent halide gas, molten metal product and molten reducing agent halide formed in zone 2 impinge and collect on the two-component film in zone 3 as well as in zone 2.

The Metal Product Lining and the Liquid Phase Film Separation of the Reaction Products In order to protect the walls of the reaction chamber from thermal shock and stress as well as corrosion due to the molten reaction products flowing thereon, and to discourage any reaction from occurring at the relatively low temperature of the chilled reaction chamber walls, such walls are lined with metal product of a suitable physical composition. This lining may be in the form of sponge, compressed sponge, sintered particles, compressed foil, solid plate, or any other suitable form. The lining may be placed on the walls of the reaction chamber before each run is started, or it may be built up upon the walls as the reaction proceeds in the following manner. As the reaction starts, the portion of the reaction which occurs immediately adjacent to the cold walls of the reaction chamber takes place at a temperature below the melting point of the metal product. Therefore, a lining of metal product sponge, which is mixed with other substances present in the reaction zone, builds in thickness upon the cold walls. As the lining thickens, its increasing thermal insulating ability allows its exposed surface to increase in temperature. As soon as the exposed surface of the lining reaches the melting point of the metal product, a steady state is achieved in which newly formed metal product and reducing agent halide impinging upon the lining remain in a two-component liquid film which flows down the solid lining. As the molten reaction products flow over the lining, they separate into two immiscible films, the lowermost being of molten metal product and the uppermost being of molten reducing agent halide, thus effecting what I call a "liquid-phase-film-separation."

Whenever the reaction chamber is in operation, the metal product lining tends to achieve an equilibrium thickness which may be controlled by any one or a combination of four factors: The pressure of the reaction chamber, the temperature of the reactants entering the reaction chamber, the flow rate of the reactants entering the reaction chamber and the temperature of the reaction chamber walls behind the lining. I have discovered that the equilibrium thickness of the lining may be decreased by increasing the condensation temperature of the reducing agent halide upon the exposed surface of the two-component film. This condensation temperature may be increased by increasing any one or a combination of three factors: the pressure of the reaction chamber, the temperature of the reactants entering the reaction chamber and the flow rate of the reactants into the reaction chamber. In addition, I have found that the equilibrium thickness of the lining may be diminished by increasing the temperature at which the reaction chamber walls are maintained. When the reaction chamber is to be operated under steady state conditions, a combination of reaction chamber wall temperature and condensation temperature of the reducing agent halide in the reaction chamber must be selected which permits a low enough equilibrium thickness for the metal product lining to prevent blocking the flow of reaction products from the reaction chamber.

Pressure of the Reaction Chamber

The pressure of the reaction chamber is most critical to my present invention. Since I have postulated a liquid phase reaction, the pressure must be maintained sufficiently high to permit the reducing agent halide gas to condense at a temperature higher than the melting point of the metal product. On an ideal basis, if the gas in the reaction flame zone and condensation zone were comprised of 100% reducing agent halide and the reducing agent halide condensate were 100% pure reducing agent halide, the lowest allowable pressure would be equal to the vapor pressure of the reducing agent halide at the melting point of the metal product. However, experience has demonstrated that various other substances such as reducing agent and metal product halide present in the reaction chamber atmosphere and dissolved in the reducing agent halide condensate might either raise or lower the effective vapor pressure of the impure reducing agent halide by-product. For this reason, the actual allowable minimum reaction pressure may be somewhat higher or lower than the vapor pressure of the pure reducing agent halide at the melting point of the metal product. Therefore, for clarity, I shall designate the condensation vapor pressure of the impure reducing agent halide gas and condensate as the "effective vapor pressure of the impure reducing agent halide formed by the reaction." Under such a definition, the lowest allowable pressure is the effective vapor pressure of the impure reducing agent halide formed in the reaction at the melting point of the metal product.

As has been mentioned before, the net heat balance of the reaction chamber system must be such as to permit the equilibrium thickness of the metal product lining to be thin enough to prevent blocking the exit of the reaction chamber. Therefore, as a practical matter, in order to maintain a desirable equilibrium thickness of the lining, the reaction chamber pressure is set such that the condensation temperature of the impure reducing agent halide is somewhat above the melting point of the metal product.

The pressure in the reaction chamber may be controlled by the pressure of the gas in the collection chamber to which it is attached. The pressure in the collection chamber in turn may be controlled by any one of a number of standard pressure control systems for closed chambers.

Reaction Zone Temperature

Since my invention postulates producing the metal product in the liquid phase, it is necessary to maintain the reaction temperature above the melting point of the metal product. Such a temperature may be maintained by providing conditions such that the partial pressure of the impure reducing agent halide within the reaction zone is maintained at least high enough to permit it to condense at the melting point of the metal product. Such a partial pressure may be maintained by the proper control of the imput temperature of the reactants to the reaction zone, the flow rate of each reactant to the reaction zone, and the control of the reaction chamber pressure. When at least some of the reducing agent halide is being produced in the liquid phase in the reaction flame zone, the temperature of the reaction flame is equal to the temperature at which the impure reducing agent halide gas is in equilibrium with the impure liquid reducing agent halide condensate.

In some cases, it may be that all the reducing agent halide is produced in gas phase in the reaction flame. In such a situation, the temperature of the flame is at least as high as and usually higher than the condensation temperature of the impure reducing agent halide at the existing pressure. However, the temperature drops sufficiently in the condensation zone adjacent to the molten reaction product film to permit the impure reducing agent halide gas to condense in the reaction chamber.

As a practical matter, the minimum allowable condensation temperature depends upon such variables as the temperature drop maintained across the metal product lining, the thermal conductivity of the lining, the diameter of the reaction chamber, the heat transmission ability of the molten reaction product film, and the melting point of the metal product. When a reaction chamber of large diameter is employed with a small temperature drop across the lining and a low thermal conductivity of the lining, a condensation temperature very close to the melting point of the metal product may be employed without danger of the reaction chamber becoming blocked.

Imput Ratio of Reactants

The optimum imput ratio of reactants varies according to the specific combination chosen. A large preponderance of reducing agent would yield a larger percentage of metal product halide reduced to metal product but may leave the metal product contaminated with reducing agent solute. Conversely, the greater the proponderance of metal product halide, the less reducing agent contamination there would be, but the lower would be the yield of metal product. Therefore, these two factors must be considered simultaneously when choosing the molar imput flow rate ratio of reactants. I have found that a nearly stoichiometric ratio is satisfactory in most cases, giving a yield of better than 90% reduction of the metal product halide to metal product with little reducing agent contamination in the metal product.

Final Form of the Metal Product

If shot is the desired final form of the metal product, the individual molten metal product drops falling from the reaction chamber exit into the collection chamber are frozen into discrete solid particles before they come into contact with one another at the bottom of the collection chamber. This may be accomplished by allowing the molten metal product drops to fall into and settle through a pool of molten reducing agent halide. The temperature of the pool of reducing agent halide is substantially below the melting point of the metal product with the result that the metal product drops freeze as they sink to the bottom of the pool. An alternative procedure would be to allow the drops of molten metal product to fall through an atmosphere of inert gas in the collection chamber such that the drops would freeze before striking the bottom.

If it is desirable to produce a metal product ingot instead of shot, both the metal product and the reducing agent halide are collected together in a chilled ingot mold and are allowed to separate gravitationally while in the liquid phase. The reducing agent halide floats on top of the molten metal product and may be continuously decanted over the rim of the ingot mold. The metal product freezes in the ingot mold to form an ingot.

The metal product ingot thus being formed may be withdrawn downward with respect to the rim of the ingot mold at such a rate that none of the molten metal product, which is collected in the metal product pool, decants over the rim with the reducing agent halide.

The rim of the ingot mold is drastically cooled by a suitable coolant circulating within internal passages within it, and the lower portions of the ingot mold walls must be maintained at a low enough temperature to prevent the metal product from forming a highly adhesive bond with the walls. Of course, if the solid metal product ingot is continuously withdrawn downwardly, it is desirable that the ingot mold be of uniform cross-sectional configuration.

As the molten metal product flows from the exit of the reaction chamber, stalactites of solid metal product, which may resemble a curtain, may form and depend from the mouth of the opening between the reaction chamber and the collection chamber. If the growth of such formations were not checked, they would ultimately block the exit. Generally, such stalactites may be limited in growth by the application of heat. One method of supplying heat to the lowest portion of the stalactites is to maintain the top surface of the pool of collecting reducing agent halide thereunder at a temperature above the melting point of the metal product by aid of hot reaction products coming from the reaction chamber, and by maintaining the level of the pool just below the reaction chamber exit. An additional method of supplying heat to limit the growth of stalactites is to maintain a heat balance in the reaction chamber such that sufficient reducing agent halide gas leaves the exit of the reaction chamber to enable reducing agent halide gas to condense upon the stalactites at a higher temperature than the melting point of the metal product.

The growth of metal product stalactites can also be limited by maintaining the pool of collecting reducing agent halide below the stalactites at a different electrical potential than the stalactites. When the stalactites reach the pool, an electrical current flows between the stalactites and the pool, generating sufficient heat to prevent their further lengthening.

The growth of metal product stalactites may also be limited by direct heating of the stalactites and the molten metal product film thereupon by electrical induction. The induction coils should be spaced in such a position relative to the stalactites that no metal product would touch the coils.

The growth of the metal product stalactites may also be limited by means of heat radiated to them from a suitable radiator or heat reflector placed around the stalactites. The radiator is placed with respect to the stalactites and to the molten reaction products flowing off the lower end of the stalactites in such a manner that no liquid reaction products contact the radiator. The radiator may be heated by electrical induction, direct electrical resistance or even by condensing reducing agent halide. In most cases, the radiator is fabricated of metal product, but, on occasion, may be of tungsten, molybdenum or graphite. The temperature of the radiator may be any temperature which is sufficient to aid the heat of reaction in limiting the growth of the stalactites.

My present invention may be run as either a continuous or a batch-type process. In the batch process, the reaction products are allowed to gather in the collection chamber until it is filled to capacity, whereupon, the reaction is ended by merely shutting off the flow of reactants to the reaction chamber. The products may be removed from the collection chamber while the reducing agent halide is in the liquid phase and the metal product in the solid phase, or, in the alternative, both may be removed in the solid phase and thereafter separated by a number of well known means. If a continuous rather than batch-type operation is desired, the reducing agent halide may be frozen in the collection chamber in the form of a continuous cast shape and be withdrawn from the open bottom of the collection chamber while the reaction is underway. The walls of the portion of the collection chamber in which the reaction products collect serve the same function as a bottomless mold and are maintained at a temperature below the melting point of the impure reducing agent halide by-product, thereby making it possible to freeze continuously the reducing agent halide into a solid cast shape. The metal product shot falling from the exit of the reaction chamber sinks to the lowermost portion of the molten reducing agent halide core becoming embedded in the central portion of the frozen reducing agent halide cast shape. The cast shape is withdrawn from the bottom of the collection chamber at a rate such as to maintain the level of the overlying molten reducing agent halide pool within desired limits. This molten pool provides a gas tight seal against the escape of gas from the collection chamber. The gas pressure in the collection chamber helps force the cast shape out of the open bottom of the collection chamber. The solid cast shape leaving the collection chamber may be fed into a suitable jaw crusher. The speed of this jaw crusher controls the rate of withdrawal of the cast shape. After crushing, the metal product shot may be separated from the reducing agent halide by mechanical means or by dissolving the halide in a suitable solvent such as water.

There are a number of other ways of removing the reaction products continuously from the collection chamber which are contemplated as being within the scope of this application and the appended claims.

Reaction Apparatus

The foregoing procedures may be carried out in the apparatus illustrated in the drawings, in which:

FIGURE 1 is a side, elevational, cross-sectional view showing the reaction chamber, part of the collection chamber and part of the ingot mold.

FIGURE 2 is a side, elevational, cross-sectional view showing the collection chamber, the ingot mold and part of the reaction chamber.

Referring now to the drawings in detail, my apparatus consists of an elongated, cylindrical reaction chamber 11, which is provided with an external jacket 12 through which flows a suitable coolant. The top 13 of the reaction chamber 11 is closed except for a circular opening 14 through which projects reactant input torch 15. The torch 15 is comprised of three concentric conduits 16, 17 and 18. The annular space between conduits 16 and 17 is connected to a source of supply of either liquid or gaseous metal product halide. The annular space between conduits 17 and 18 is connected to a source of supply of inert gas. Conduit 18 is connected to a source of liquid or gaseous reducing agent. The lower end of conduit 18 is provided with a conical spray nozzle 19 which is so positioned as to spray the reducing agent down the central axis of the reaction chamber in a full conical spray. The metal product halide flows from the annular orifice defined by the ends of conduits 16 and 17 downwardly into the reducing agent spray emitting from the nozzle 19. A controlled flow rate of inert gas flows from the annular orifice defined by the space between the reducing agent spray nozzle 19 and the lower end of conduit 17. The presence of inert gas between the reducing agent nozzle 19 and the metal product halide orifice helps to prevent metal product sponge from forming on and blocking the orifice of the reducing agent nozzle 19. In the alternative, deposition of metal product sponge on the reducing agent nozzle orifice can be prevented by spraying the reducing agent out of it under a very high pressure.

A collection chamber 20 is provided below the reaction chamber 11. It is preferable that the collection chamber be cylindrical and coaxial with the reaction chamber but its particular shape is not critical to my invention. The collection chamber 20 is provided with coolant jackets or passages 21 which connect to the coolant jacket 12 which surrounds the reaction chamber 11. Within the collection chamber 20 is an ingot mold 22 which is shown to be cylindrical although its shape is not critical to my invention. The ingot mold 22 is provided with coolant jackets or passages 23 within its walls. Within the ingot mold 22, there is a retractable piston 24 of substantially the same cross-sectional shape of the ingot mold 22. The piston 24 is connected to a piston rod 25 which may be raised or lowered by some suitable system not shown in the drawings. The piston rod 25 passes through an opening 26 in the bottom 27 of the collection chamber 20. The bottom 27 of the collection chamber 20 is formed integral with the ingot mold 22 and is provided with coolant passages 28 which connect with the coolant passages 23 in the walls of the ingot mold 22. The bottom 27 of the collection chamber 20 and the ingot mold 22 may be moved up and down with respect to the collection chamber by any suitable system not shown in the drawings. A gasket 29 seals the bottom 27 of the collection chamber to the walls thereof.

The piston 24 within the ingot mold 22 is provided with holes 30 through which may be placed bolts 31 made of metal product. The ends of the bolts 31 are threaded and are provided with nuts 32. The opposite ends of the metal product bolts 32 extend through the piston 24 into that portion of the ingot mold 22 where molten metal product collects.

The top 33 of the collection chamber 20 is provided with a conduit 34 through which inert gas at a controlled pressure passes. A heat reflector 35 surrounds the exit 36 of the reaction chamber 11 which projects downwardly through the top of the collection chamber 20. This heat reflector 35 decreases the rate of heat loss from the area surrounding the exit 36 of the reaction chamber 11 and may be made of metal product.

The reaction chamber 11, collection chamber 20 and ingot mold 22 may be fabricated of copper, nickel or any other strong, corrosion resistant material with a high coefficient of thermal conductivity.

In operation, liquid or gaseous metal product halide and reducing agent are passed at a controlled flow rate from the lower end of the torch 15. At the same time, a gentle, controlled flow of inert gas is emitted from the annular orifice defined by the ends of conduits 17 and 18. At the imput temperature of the reactants, a spontaneous flame-type reaction occurs forming metal product and reducing agent halide. Since the reaction chamber 11 is drastically cooled, any reaction which occurs near its walls will take place at a temperature below the melting point of the metal product, thereby producing a metal product sponge which is mixed with a variable amount of reducing agent halide and other substances present in the reaction flame. This metal product sponge forms a lining 37 which lightly adheres to the walls of the reaction chamber 11.

The gentle flow of inert gas emitting from the torch 15 forms a protective layer of inert gas about the end of the torch 15. The inert gas may extend from the end of the torch 15 to the top 13 of the reaction chamber 11 to form a cover gas zone 38. Interface 39 represents the boundary between the cover gas zone 38 above and the reaction flame zone 40 below.

The drawings show the reaction after steady state conditions have been reached. The metal product sponge lining 37 covers the walls of the reaction chamber 11 as well as the rim 41 of the exit 36 of the reaction chamber 11. A two-component film 42 has formed over the metal product sponge lining 37. The film 42 is comprised of an overlying film of molten reducing agent halide 43 containing some suspended molten metal product mist, and an underlying film of molten metal product 44. Interface 45 represents the boundary between the reaction flame zone 40 above and the condensation zone 46 below. In the condensation zone 46, which is cooler than the reaction flame zone, a substantial amount of the reducing agent halide gas formed in the reaction flame zone 40 condenses on the exposed surface of the two-component film 42. As the reaction products flow downwardly in the film 42, the two distinct immiscible films of metal product 44 and reducing agent halide 43 become more defined and pure. As has been previously mentioned, some reaction between reducing agent solute in the molten metal product and metal product halide solute in the reducing agent halide condensate may occur to remove undesirable reducing agent solute from the molten metal product before it leaves the reaction chamber 11.

As the molten metal product flows from the exit 36 of the reaction chamber, it may form a curtain 47 of stalactites which depends from the rim 41 of the exit 36 of the reaction chamber 11. The length of these stalactites may be controlled by any one of the methods previously described. In the drawings, I have shown a construction whereby the length of the stalactites 47 is limited by the presence of a pool 48 of molten reducing agent halide which lies in the ingot mold 22 immediately below the exit 36 of the reaction chamber 11. This pool 48 is also in contact with the metal product stalactite curtain 47. The temperature of the reducing agent halide pool 48 is higher than the melting point of the metal product and thereby limits the growth of the metal product curtain 47. The pool 48 of reducing agent halide floats on top of a pool 49 of molten metal product in the ingot mold 22. Below the metal product pool 49 is solid metal product 50 which has frozen in the ingot mold 22. In FIGURE 2, the retractable piston 24 has been continuously lowered at a rate calculated to maintain the top of the pool 49 of collecting metal product a constant distance below the rim 51 of the ingot mold 22. Therefore, substantially all the molten metal product dripping from the stalactite curtain 47 is retained in the ingot mold 22; whereas, the molten reducing agent halide decants over the rim 51 of the ingot mold 22. The molten reducing agent halide then flows into the annular space between the collection chamber 20 and the ingot mold 22. The reducing agent halide then solidifies into a solid cake 52.

As the retractable piston 24 is lowered, the bolts 31, which have fused with the metal product 50 before it froze in the ingot mold 22, pull the solid metal product skull 50 downwardly with sufficient force to overcome the friction between it and the ingot mold 22.

At the conclusion of the run, the reaction may be terminated by turning off the flow of reactants to the reaction chamber 11. After the decanted reducing agent and the molten metal product pool 49 have frozen and cooled, the ingot 50 and the reducing agent halide cake 52 may be removed from the collection chamber by lowering the collection chamber bottom 27 a suitable distance. Neither the metal product ingot 50 nor the reducing agent halide cake 52 sticks hard to the cold walls because of the inability of the hot molten reaction products to wet the drastically chilled walls.

In order to describe my process more elaborately, I present the following example:

*Example 1.—Continuous production of molten titanium and molten sodium chloride; and, also, the production of a pure titanium ingot.*—Apparatus similar to that shown in FIGURES 1 and 2 is provided. Also, two storage tanks are provided; one, heated, for liquid sodium and the other for liquid titanium tetrachloride. A duplex proportioning pump supplies a separate stream of each reactant from the respective storage tanks to the appropriate channel in the reactant imput torch for the reaction chamber. The reaction chamber comprises a water cooled copper cylinder, approximately 7 inches in internal diameter and 15 feet high with its central axis vertical. The top of the reaction chamber is closed, but the bottom is open and connects with a water cooled, copper collection chamber which is a cylinder approximately 8 feet in internal diameter and 8 feet deep mounted with its central axis vertical and coincident with the vertical axis of the reaction chamber. The open bottom of the reaction chamber is one foot below the roof of the collection chamber. The lower end of the reactant imput torch is approximately 2 feet below the roof of the reaction chamber and is positioned to spray the reactants in a conical spray down the central axis of the reaction chamber.

The ingot mold is fabricated of copper, is water cooled, has its rim on a horizontal plane approximately 6 inches below the bottom of the reaction chamber, has an internal diameter of 24 inches, and has its central axis coincident with the central axis of the collection chamber and the reaction chamber. The ingot mold sits upon and is attached to the center of the collection chamber bottom. The collection chamber bottom is detachable from the collection chamber side walls. When the collection chamber is to be opened, the collection chamber bottom and the entire ingot mold attached thereto can be lowered sufficiently to enable the contents of the collection chamber and the ingot mold to be removed easily. During each run, the collection chamber bottom is pressed hard against a suitable gasket located between it and the lower edge of the collection chamber side walls.

The ingot mold is provided with a retractable piston which can slide up or down through its bore. This retractable piston is approximately 23.9 inches in diameter, is fabricated of nickel and is cooled with water. Vertical holes are provided in the retractable piston in order that titanium bolts can be passed through those holes as is shown in FIGURE 2. The retractable piston is provided with means for raising or lowering it at a controlled rate within the ingot mold.

In the top of the collection chamber, there is a conduit leading to a system which is capable of evacuating the collection chamber or maintaining a controlled pressure of helium in it.

Before the start of a run, the reaction chamber and collection chamber system are sealed air tight by reason of the collection chamber bottom being pressed against the sealing gasket, and the air in it is pumped out and replaced with helium at approximately 12 atmospheres' pressure. Cold water is circulated through the walls of the reaction chamber, collection chamber and ingot mold. The retractable piston is positioned 3 inches below the rim of the ingot mold. The reactant proportioning pump is adjusted to deliver 5 moles per second of titanium tetrachloride and 19.5 moles per second of sodium to the reaction chamber. The inert gas feed system is adjusted to deliver 0.005 mole per second of helium. Titanium bolts are inserted in the bolt holes of the retractable piston such that the upper ends of the bolts extend about 2 inches above the top surface of the retractable piston. The apparatus is now in condition to start a run.

A flame-type reaction is initiated spontaneously as soon as the reactants come in contact with each other. The sodium is introduced at approximately 150° C. in the form of a full conical spray directed down the central axis of the reaction chamber from a spray nozzle in the center of the tip of the reactant imput torch. The 0.005 mole per second of helium is introduced from an annular orifice situated immediately around the sodium nozzle. The liquid titanium tetrachloride reactant is introduced at 150° C. from an annular orifice immediately surrounding the inert gas orifice. As a result, the titanium tetrachloride and the sodium mix thoroughly and react below the reactant imput torch.

At the beginning of the reaction period, the portion of the reaction flame, which is immediately adjacent to the cold reaction chamber walls, takes place at a temperature below the melting point of titanium. Therefore, a lining of titanium sponge, which is mixed with sodium chloride, titanium dichloride and some sodium, builds in thickness upon the cold walls. As the lining thickens, its interface with the reaction flame increases in temperature. As soon as the exposed surface of the lining reaches the melting point of titanium, the lining ceases to increase further in thickness, and all the reaction products impinging upon it thereafter remain in liquid phase and flow down it in a two-component film. As the liquid titanium and liquid sodium chloride flow down the molten surface of the lining towards the reaction chamber exit, the aforementioned process of "liquid-phase-film-separation" causes substantially all the molten titanium to separate from the molten sodium chloride. The result is that almost all the molten titanium is consolidated in a flowing film of molten titanium before it is discharged from the reaction chamber.

Immediately after the titanium sponge lining has reached steady state thickness, molten reaction products flow from the exit of the reaction chamber into the ingot mold and collect on top of the retractable piston. Within a short time, molten sodium chloride fills the ingot mold and then starts pouring over the ingot mold rim. As fast as molten titanium pours into the ingot mold, it sinks to the bottom of the molten sodium chloride pool and collects into a molten pool of titanium. The great heat of the collecting molten titanium melts the upper end of the titanium bolts which were inserted through the bolt holes in the retractable piston. Therefore, as the bottom of the molten titanium pool freezes, the bolts are frozen fast into the bottom of the forming ingot. These bolts serve to draw the forming ingot downward with the retractable piston. As soon as the titanium pool builds up to within about two inches of the level of the ingot mold rim, the retractable piston is lowered at a rate calculated to maintain the top of the titanium pool two inches below the ingot mold rim.

As the molten titanium flows from the exit of the reaction chamber into the ingot mold, a portion of it freezes forming a curtain of stalactites which depends from the bottom edge of the reaction chamber. These stalactites elongate until they come in contact with the surface of the molten sodium chloride in the ingot mold. This molten sodium chloride is above the melting point of titanium because of the high temperature of the molten reaction products flowing into it. Therefore, the sodium chloride pool is hot enough to prevent the stalactites from building downward below its surface.

The pressure within the reaction chamber and the collection chamber is maintained at approximately 12 atmospheres by means of the helium pressure control system.

A conical titanium heat reflector is provided over the ingot mold in the same general position as is shown in the drawings. Such a heat reflector tends to arrest heat loss from the molten reaction products in the ingot mold.

As the reaction proceeds, the three zones of the reaction chamber as shown in FIGURE 1 become apparent. A helium atmosphere collects under the roof of the reaction chamber and extends downward to a level slightly below the reactant imput torch, thereby defining the cover gas zone. Substantially no reaction takes place in this zone. The principal part of the reaction takes place in the reaction flame zone which extends from the level where the reactants mix to a point midway down the reaction chamber. In the uppermost portion of the reaction flame zone, liquid titanium tetrachloride is vaporizing, creating a localized atmosphere of titanium tetrachloride. The liquid sodium being sprayed from the reactant imput torch burns in this localized atmosphere to produce titanium dichloride, titanium and sodium chloride. Lower down in the reaction flame zone, liquid sodium that escaped reaction in the upper portion vaporizes. As one progresses downwardly in the reaction flame zone, the partial pressure of sodium chloride gas increases to a maximum at the interface of the reaction flame zone and the condensation zone. All of the sodium chloride gas produced in the reaction chamber is produced in the reaction flame zone. The upper portion of the reaction flame zone is rich in titanium tetrachloride gas, the middle portion contains a turbulent and highly variable mixture of titanium tetrachloride gas, titanium dichloride gas, sodium gas and sodium chloride gas plus a trace of helium and other gases, and the lower portion is predominately sodium chloride gas with some sodium gas and titanium dichloride gas. In the condensation zone, which may extend from the bottom of the reaction flame zone to the bottom of the reaction chamber, most of the sodium chloride gas generated in the reaction flame zone condenses upon the two-component film of molten reaction products flowing down the exposed surface of the titanium sponge lining. The condensing sodium chloride brings down a considerable quantity of the sodium gas and the titanium dichloride gas within it. At the point where the sodium gas and the titanium dichloride gas are brought down, they react with each other and with titanium dichloride solute in the molten sodium chloride film to produce additional liquid titanium and liquid sodium chloride. The condensation zone is relatively non-turbulent in comparison to the reaction flame zone.

In the upper portion of the reaction chamber adjacent to the reaction flame zone, the molten titanium being formed in the reaction flame zone may contain a considerable concentration of gaseous sodium solute. Also, the liquid sodium chloride formed in the reaction flame zone may contain a considerable quantity of titanium dichloride solute. As the molten titanium and the molten sodium chloride flow down the titanium sponge lining to the exit of the reaction chamber, the sodium solute in the molten titanium may react with the titanium dichloride solute in the molten sodium chloride to form more liquid titanium and liquid sodium chloride. The net result of this liquid phase reaction is to remove substantially all the sodium solute from the molten titanium before it is discharged from the reaction chamber.

Thus, liquid titanium containing only a trace of dissolved sodium, and liquid sodium chloride, which is saturated with liquid titanium and contains some unreacted titanium dichloride, flows into the ingot mold. Also, some sodium chloride gas, which contains a considerable quantity of sodium gas and a lesser amount of titanium dichloride gas, flows into the collection chamber from the reaction chamber.

The exit of the reaction chamber is prevented from becoming blocked with frozen titanium by the flow of hot reaction products and sodium chloride gas through it. Also, heat is supplied to the titanium stalactite formation by reason of the sodium chloride pool, which is immediately beneath it, having a temperature higher than the melting point of titanium.

Assuming a 90% conversion of the titanium tetrachloride feed into liquid titanium in the reaction chamber, approximately 1,710 pounds per hour of liquid titanium would be produced in this example, as well as approximately 9,300 pounds of impure sodium chloride. A typical run may extend for 1½ hours in which an ingot of pure titanium of approximately 23 inches in diameter by 30 inches long may be produced. At the end of the run, the imput flow of reactants may be simply stopped to terminate the reaction. After the contents of the annular bottom of the collection chamber and of the ingot mold cool to near room temperature, the helium pressure in the collection chamber may be released, and the bottom of the collection chamber lowered in order that the ingot and the salt cake can be recovered.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. The method of producing pure refractory metals selected from the group consisting of titanium, hafnium, vanadium, silicon, zirconium, thorium, columbium and chromium comprising introducing into a reaction chamber a dispersed stream of liquid reducing agent selected from the group consisting of lithium, sodium, potassium, rubidium, cesium, magnesium, and calcium; simultaneously introducing into the reaction chamber a dispersed stream of a liquid halide of a desired metal product selected from the group consisting of titanium, hafnium, vanadium, silicon, zirconium, thorium, columbium, and chromium to produce a dispersed stream of liquid metal product and liquid reducing agent halide having a critical temperature at least as high as the melting point of the chosen metal product in a spontaneous, self-sustaining reaction flame; impinging the dispersed stream of liquid reaction products on the walls of the reaction chamber; drastically chilling the reaction chamber walls, producing and maintaining a self-healing, insulating lining of predominantly metal product sponge on the drastically chilled walls of the reaction chamber; further impinging and collecting the liquid reaction products on the metal product sponge lining; separating and collecting liquid reaction products into pure liquid metal product and pure liquid reducing agent halide while on the metal product sponge lining; maintaining the temperature of the collecting reaction products at least as high as the melting point of the metal product, and gravitationally discharging the pure, liquid reaction products from the reaction chamber into an area having a pressure approximately equal to that of the reaction chamber.

2. The method of producing pure refractory metals selected from the group consisting of titanium, hafnium, vanadium, silicon, zirconium, thorium, columbium, and chromium comprising the procedure in accordance with claim 1 and producing and maintaining an atmosphere in and about the reaction flame of predominantly gaseous reducing agent and gaseous metal product halide in equilibrium with respectively liquid reducing agent and liquid metal product halide at the existing temperature and pressure, with relatively small quantities of gaseous reaction products in equilibrium with liquid reaction products, and gaseous intermediate reaction products in equilibrium with liquid intermediate reaction products.

3. The method of producing pure refractory metals selected from the group consisting of titanium, hafnium, vanadium, silicon, zirconium, thorium, columbium and chromium comprising the procedure in accordance with claim 1 and reacting unreacted reducing agent with metal product sub-halide by-product in the molten, flowing film of liquid reaction products, which are collecting and separating on the metal product sponge lining.

4. The method of producing pure refractory metals selected from the group consisting of titanium, hafnium, vanadium, silicon, zirconium, thorium, columbium and chromium comprising the procedure in accordance with claim 1 and gravitationally discharging the molten flowing film of reducing agent halide and the molten flowing film of metal product from the bottom of the reaction chamber, heating the lower-most portions of the said molten flowing films, and balancing the rate of heat input to the reaction chamber against the rate of heat output to maintain the metal product sponge lining at a substantially constant thickness and to prevent blockage of the bottom of the reaction chamber with frozen reaction products.

5. The method of producing pure refractory metals selected from the group consisting of titanium, hafnium, vanadium, silicon, zirconium, thorium, columbium and chromium comprising the procedure in accordance with claim 1 and gravitationally discharging the said molten flowing films of reaction products from the bottom of the reaction chamber, separating the reaction products, and freezing the metal product.

6. The method of producing pure refractory metals selected from the group consisting of titanium, hafnium, vanadium, silicon, zirconium, thorium, columbium and chromium comprising the procedure in accordance with claim 1 wherein the liquid reaction products impinging and collecting on the metal product sponge lining separate into two immiscible, molten films flowing on the said lining, the lower film being pure liquid metal product and the upper film being liquid reducing agent halide.

7. The method of producing pure refractory metals selected from the group consisting of titanium, hafnium, vanadium, silicon, zirconium, thorium, columbium and chromium comprising the procedure in accordance with claim 1 and maintaining the partial pressure of the reducing agent halide impinging and collecting on the metal product sponge lining at least equal to its effective condensation vapor pressure at the temperature adjacent to the reaction flame.

8. The method of producing pure refractory metals selected from the group consisting of titanium, hafnium, vanadium, silicon, zirconium, thorium, columbium and chromium comprising the procedure in accordance with claim 1 and collecting discharging liquid reaction products in a collection chamber, maintaining the pressure of the collection chamber substantially equal to that of the reaction chamber, and gravitationally separating the reaction products in the collection chamber while still in the liquid phase.

9. The method of producing pure refractory metals selected from the group consisting of titanium, hafnium, vanadium, silicon, zirconium, thorium, columbium and chromium comprising the procedure in accordance with claim 1 and collecting the discharging reaction products in an ingot mold, gravitationally separating the liquid reaction products in the ingot mold into an overlying layer of liquid reducing agent halide and an underlying layer of liquid metal product, continuously decanting the supernatant, liquid reducing agent halide from the ingot mold, continuously freezing the metal product in the ingot mold, and continuously withdrawing downwardly the frozen metal product.

References Cited in the file of this patent

UNITED STATES PATENTS

| | | |
|---|---|---|
| 2,205,854 | Kroll | June 25, 1940 |
| 2,782,116 | Spedding et al. | Feb. 19, 1957 |
| 2,787,539 | Conklin | Apr. 2, 1957 |
| 2,817,585 | Winter | Dec. 24, 1957 |
| 2,826,491 | Findlay | Mar. 11, 1958 |
| 2,828,199 | Findlay | Mar. 25, 1958 |
| 2,865,738 | Muller | Dec. 22, 1958 |
| 2,941,867 | Maurer | June 21, 1960 |

FOREIGN PATENTS

| | | |
|---|---|---|
| 736,852 | Great Britain | Sept. 14, 1955 |